United States Patent
Noguchi et al.

(10) Patent No.: US 7,486,872 B2
(45) Date of Patent: *Feb. 3, 2009

(54) INFORMATION EDITING APPARATUS AND INFORMATION REPRODUCING APPARATUS

(75) Inventors: Tadashi Noguchi, Tokorozawa (JP); Hidehiro Ishii, Tokorozawa (JP); Toshiro Tanikawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 846 days.

This patent is subject to a terminal disclaimer.

(21) Appl. No.: 10/937,779

(22) Filed: Sep. 10, 2004

(65) Prior Publication Data

US 2005/0031300 A1    Feb. 10, 2005

Related U.S. Application Data

(63) Continuation of application No. 09/592,609, filed on Jun. 12, 2000, now Pat. No. 6,813,434.

(30) Foreign Application Priority Data

Jun. 11, 1999    (JP) ............................... P11-165420

(51) Int. Cl.
H04N 5/93   (2006.01)
G11B 27/02  (2006.01)
G11B 27/00  (2006.01)

(52) U.S. Cl. ..................... 386/52; 386/55; 360/13; 369/83

(58) Field of Classification Search ............. 386/4, 386/52, 55, 64, 125, 126; 360/13; 369/83
See application file for complete search history.

(56) References Cited

U.S. PATENT DOCUMENTS 5,717,663 A   2/1998  Fujita
5,859,662 A   1/1999  Cragun et al.
5,937,136 A   8/1999  Sato (Continued)

FOREIGN PATENT DOCUMENTS

EP    0 731 469 A2    9/1996

(Continued)

OTHER PUBLICATIONS

Japanese Abstract No. 09270992, dated Oct. 14, 1997.

*Primary Examiner*—Thai Tran
*Assistant Examiner*—Heather R Jones
(74) *Attorney, Agent, or Firm*—Steve A. Wong

(57) ABSTRACT

An information editing apparatus for editing a reproduction manner of record information which is recorded on an information storage medium and includes at least one picture information, includes: a selecting unit for selecting a partial record information from the record information, the partial record information being part of the record information and including at least one picture information; a designating unit for designating a reproduction timing of the selected partial record information; an extracting unit for extracting the picture information included in the partial record information as a representative picture information indicative of the partial record information; and a recording unit for recording one of the extracted representative picture information and a designation information indicative of a recorded position on the information storage medium of the representative picture information and the designated reproduction timing on the information storage medium as a reproduction control information separately from the record information.

4 Claims, 12 Drawing Sheets

U.S. PATENT DOCUMENTS

| | | | |
|---|---|---|---|
| 6,134,378 A | 10/2000 | Abe et al. | |
| 6,154,601 A * | 11/2000 | Yaegashi et al. | 386/52 |
| 6,275,451 B1 | 8/2001 | Park et al. | |
| 6,489,969 B1 | 12/2002 | Garmon et al. | |
| 6,674,955 B2 | 1/2004 | Matsui et al. | |
| 6,813,434 B1 * | 11/2004 | Noguchi et al. | 386/52 |

FOREIGN PATENT DOCUMENTS

| | | |
|---|---|---|
| EP | 0 841 665 A2 | 5/1998 |
| EP | 0 917 149 A2 | 5/1999 |
| JP | H9-168130 | 6/1997 |
| JP | H9-247602 | 9/1997 |
| JP | H9-270992 | 10/1997 |

* cited by examiner

ORIGINAL

ADD

DELETE

EXCHANGE

CHANGE TIME

INFORMATION EDITING APPARATUS AND INFORMATION REPRODUCING APPARATUS

This is a continuation of application Ser. No. 09/592,609 filed Jun. 12, 2000 now U.S. Pat. No. 6,813,434.

BACKGROUND OF THE INVENTION

1. Field of the Invention

The present invention relates to an information editing apparatus for editing a reproduction manner of a recorded information already recorded on an information storage medium, and an information reproducing apparatus for reproducing the recorded information in the manner edited by the information editing apparatus. More particularly, the present invention relates to an information editing apparatus for editing a reproduction manner of the recorded information including one or a plurality of picture information, and an information reproducing apparatus for reproducing the recorded information in the manner edited by the information editing apparatus.

2. Description of Related Art

If recorded information such as a plurality of broadcast programs or the like (hereinafter, recorded information to be continuously reproduced will be referred to as a "program") is recorded in a currently popular video tape recorder so that a user can select a target program desired to be viewed from the plurality of programs, it is necessary to find a leading portion of the target program by performing feed-forward or feed-back operation on the video tape and then start the reproduction therefrom.

However, this reproduction method is inconvenient in the cases where many programs are recorded on one video tape or where a recording time for each program is long even if the number of recorded program is small.

So, the following configuration is proposed in order to solve that disadvantage. That is, a recording position on a video tape, a recorded date, a channel (in a case of a broadcasted program) and the like are extracted for each recorded program. Then, those information for all recorded programs are collected and recorded at a leading area of the video tape as contents information. At the time of reproduction, the contents information is used to select the target program desired to be viewed. The reproduction apparatus searches for the recording position of the desired program by referring to the contents information, and then automatically starts the reproduction of the program.

However, in the above-mentioned conventional program searching method, only a character such as a title of each program and the like is recorded as the contents information. Therefore, it is quite inconvenient for a user who wants to grasp the whole contents of the recorded programs at a glance.

Also, in the above-mentioned conventional program reproducing method, the recorded programs can be reproduced only in a manner that they are originally recorded. Thus, a user cannot arbitrarily edit and view the recorded programs in a manner as he or she desires.

SUMMARY OF THE INVENTION

The present invention is proposed in view of the above mentioned problems. It is therefore an object of the present invention to provide an information editing apparatus and an information reproducing apparatus, which enable a user to arbitrarily edit the reproduction manner of the recorded information such as pre-recorded programs so that the content of the recorded programs are intuitively recognizable, and to easily select and reproduce the desired program.

According to one aspect of the present invention, there is provided an information editing apparatus for editing a reproduction manner of record information which is recorded on an information storage medium and includes at least one picture information, including: a selecting unit for selecting a partial record information from the record information, the partial record information being part of the record information and including at least one picture information; a designating unit for designating a reproduction timing of the selected partial record information; an extracting unit for extracting the picture information included in the partial record information as a representative picture information indicative of the partial record information; and a recording unit for recording the designated reproduction timing and either one of the extracted representative picture information and a designation information indicative of a recorded position on the information storage medium of the representative picture information onto the information storage medium as a reproduction control information separately from the record information.

In this apparatus, the reproduction timing of the partial record information is recorded together with either one of the representative picture information and the designation information corresponding to the representative picture information. Therefore, the partial record information already recorded may be edited to be reproduced at an arbitrary reproduction timing, and the partial record information reproduced with the aid of the representative picture information at the time of reproduction may be intuitively recognized.

The extracting unit may extract the picture information to be firstly reproduced on a reproduction time axis of the partial record information, as the representative picture information, among the picture information included in the partial record information. By this, the contents of the partial record information to be reproduced may be easily recognized.

The selecting unit may select a plurality of the partial record information from the record information, the designating unit may designate an order of reproducing the selected plurality of partial record information as the reproduction timings corresponding to the selected respective partial record information, respectively, the extracting unit may extract one of the representative picture information that collectively represents the plurality of partial record information, with regard to selected plurality of the partial record information; and the recording unit may record the designated plurality of reproduction timings, and one of the extracted one representative picture information and the designation information corresponding to the representative picture information, as the reproduction control information, on the information storage medium. By this, the reproduction order of the plurality of partial record information may be arbitrarily edited, and the contents of the partial record information may be easily recognized by a single representative picture information when reproducing the plurality of partial record information collectively.

The recording unit may generate a plurality of the reproduction control information, which are intended to respectively reproduce a plurality of the partial record information in different reproduction order and include one of the representative picture information different from each other for each reproduction control information and the designation information different from each other for each reproduction control information corresponding to the representative picture information, and then records the reproduction control information on the information storage medium. Therefore, by combining the plural partial record information selected from a single record information, they can be edited to be reproduced in a different reproduction order. At the time of reproduction, the contents of each partial record information may be recognized by one of the representative picture information and the designation information corresponding thereto, for each different reproduction order.

The information editing apparatus may further include a changing unit for changing a content of the reproduction control information to generate a changed reproduction control information and for recording the generated changed reproduction control information on the information storage medium. Thus, one record information may be reproduced in plural kinds of reproduction manner without changing the contents of the record information.

The change of the contents of the reproduction control information by the changing unit may include erasing a part of the plurality of the partial record information. Thus, a part of the recorded information may be removed without changing the recorded information.

The information editing apparatus may further include: a judging unit for judging whether or not the representative picture information included in the reproduction control information is included in the partial record information to be reproduced based on the changed reproduction control information, and a picture information changing unit for changing one of the representative picture information and the designation information indicative of the recorded position on the information storage medium of the representative picture information to one of the picture information included in the partial record information to be reproduced based on the changed reproduction control information and the picture designation information indicative of the recorded position on the information storage medium of the picture information, when the representative picture information is not included in the partial picture information to be reproduced based on the changed reproduction control information. Therefore, in response to the change of the reproduction control information, one of the representative picture information and the designation information corresponding thereto may also be changed. In addition, it is possible to prevent the representative picture information inconsistent with the changed reproduction control information from being outputted at the time of reproduction.

The information editing apparatus may further include: a judging unit for judging whether or not the representative picture information included in the reproduction control information is included in the partial record information to be reproduced based on the changed reproduction control information, and an erasing unit for erasing the representative picture information when the representative picture information is not included in the partial picture information to be reproduced based on the changed reproduction control information. Thus, if the reproduction control information is changed, it is possible to prevent the representative picture information inconsistent with the changed reproduction control information from being outputted at the time of reproduction.

According to another aspect of the present invention, there is provided an information reproducing apparatus for reproducing recorded information which is recorded by an information editing apparatus described above, including: an outputting unit for extracting the representative picture information from the reproduction control information and for outputting the extracted representative picture information; and a reproducing unit for reproducing the record information based on the outputted representative picture information. By this, the partial recorded information may be reproduced with recognizing the contents thereof by the representative picture information.

According to still another aspect of the present invention, there is provided an information reproducing apparatus for reproducing recorded information which is recorded by an information editing apparatus described above, including: an outputting unit for extracting the representative picture information from each of the reproduction control information to output a plurality of representative picture information; a reproduction control information selecting unit for selecting the reproduction control information indicative of the reproduction order based on the selected reproduction control information; and a reproducing unit for reproducing the record information based on the selected reproduction control information. By this, if the reproduction control information for different reproduction orders are recorded, it is possible to reproduce the partial record information with recognizing, in advance, the reproduction contents corresponding to the respective reproduction control information by the respective representative picture information.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Preferred embodiments of the present invention will be explained below with reference to the drawings. It is noted that the following embodiments are directed to the case where the present invention is applied to an information recording and reproducing apparatus that can record and reproduce information on and from a disc-type storage medium (specifically, a DVD on which information can be rewritten for a plurality of times, hereinafter simply referred to as an "optical disc") on which information can be optically record and from which information can be reproduced for a plurality of times.

(I) Whole Configuration and Operation

At first, the whole configuration of the information recording and reproducing apparatus according to an embodiment will be described with reference to FIGS. 1 to 3.

Figure 1:
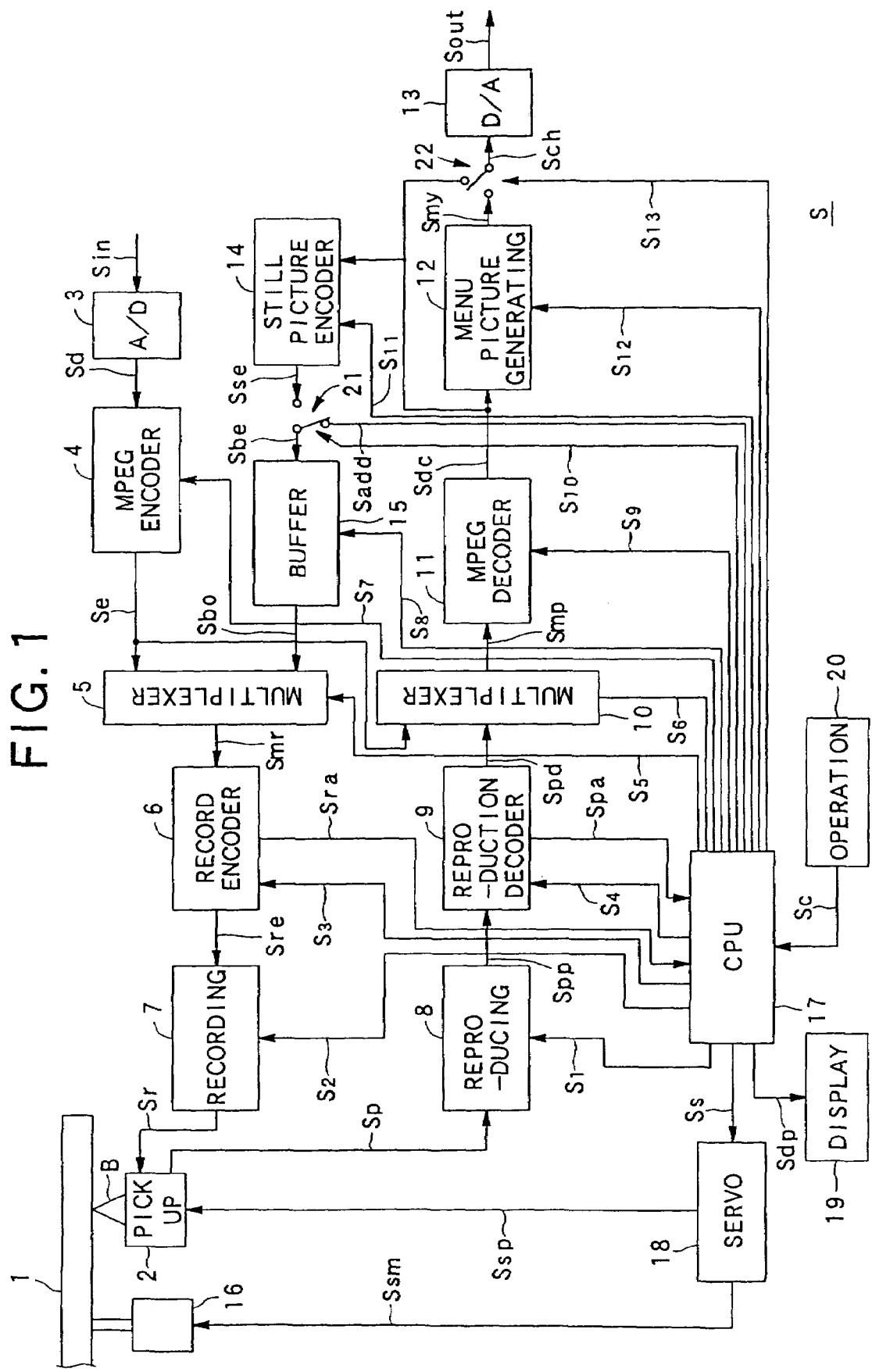
FIG. 1 is a block diagram showing a schematic configuration of an information recording and reproducing apparatus according to an embodiment.

As shown in FIG. 1, an information recording and reproducing apparatus S in the embodiment is provided with a pickup 2, an A/D (Analog/Digital) converter 3, an MPEG (Moving Picture Coding Expert Group) encoder 4, multiplexers 5, 10, a record encoder 6, a recording circuit 7, a reproduction circuit 8, a reproduction decoder 9, an MPEG decoder 11, a menu picture generating circuit 12, a D/A converter 13, a still picture encoder 14, a buffer 15, a spindle motor 16, a CPU 17, a servo circuit 18, a display unit 19, an operation unit 20, and switches 21, 22.

Figure 2:
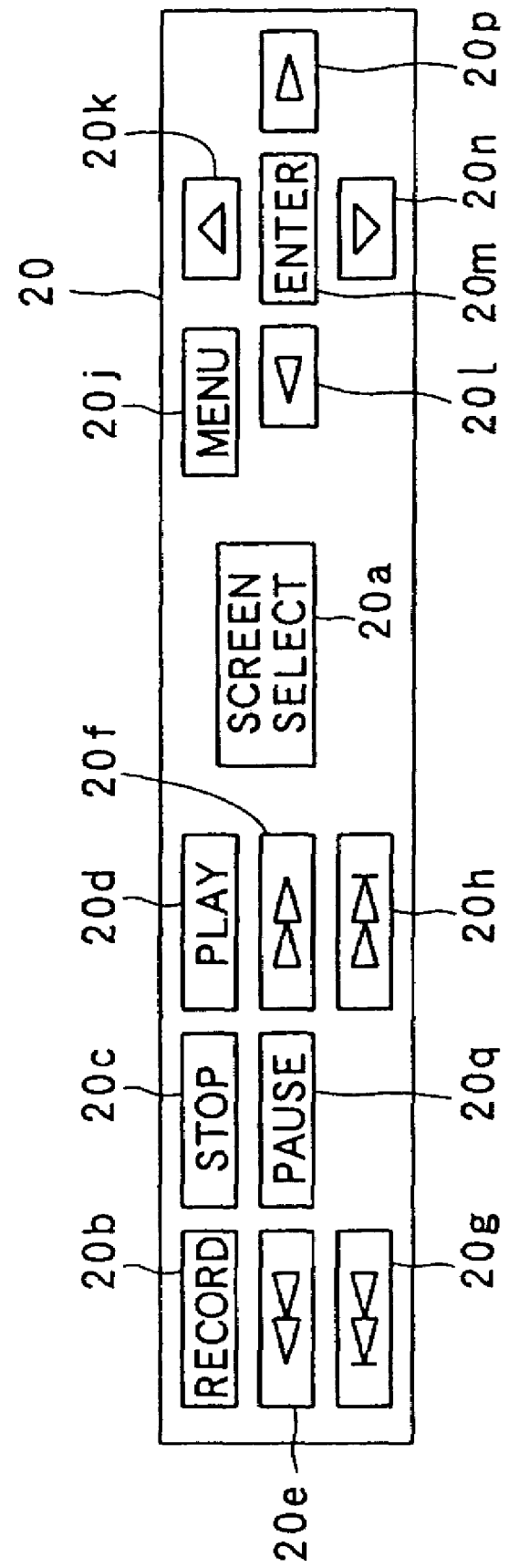
FIG. 2 is a plan view showing a schematic configuration of an operation unit of the embodiment.

As shown in FIG. 2, the operation unit 20 includes a screen selection button 20a to select a picture indicative of a later-described program on a menu picture by using a later-described process; a record button 20b to start recording the program; a stop button 20c to stop the recording or reproduction of the program; a reproduction button 20d to start reproducing the program; a quick feedback button 20e to perform a quick feedback of an optical disc 1 and then execute the recording or reproduction; a quick feed forward button 20f to perform a quick feed forward operation on the optical disc 1 and then execute the recording or reproduction; a quick feedback stop button 20g to perform the quick feedback operation on the optical disc 1 and then stop at a leading portion of one program; a quick feed forward stop button 20h to perform the quick feed forward operation on the optical disc 1 and then stop at a ending portion of one program; a pause button 20q to pause the recording or reproduction; a menu button 20j to display a menu picture necessary for later-described operation; election buttons 20k, 20l, 20n and 20p used when each program s selected on the displayed menu picture; and a determination utton 20m to determine the selection operation after the selection.

Figure 3:
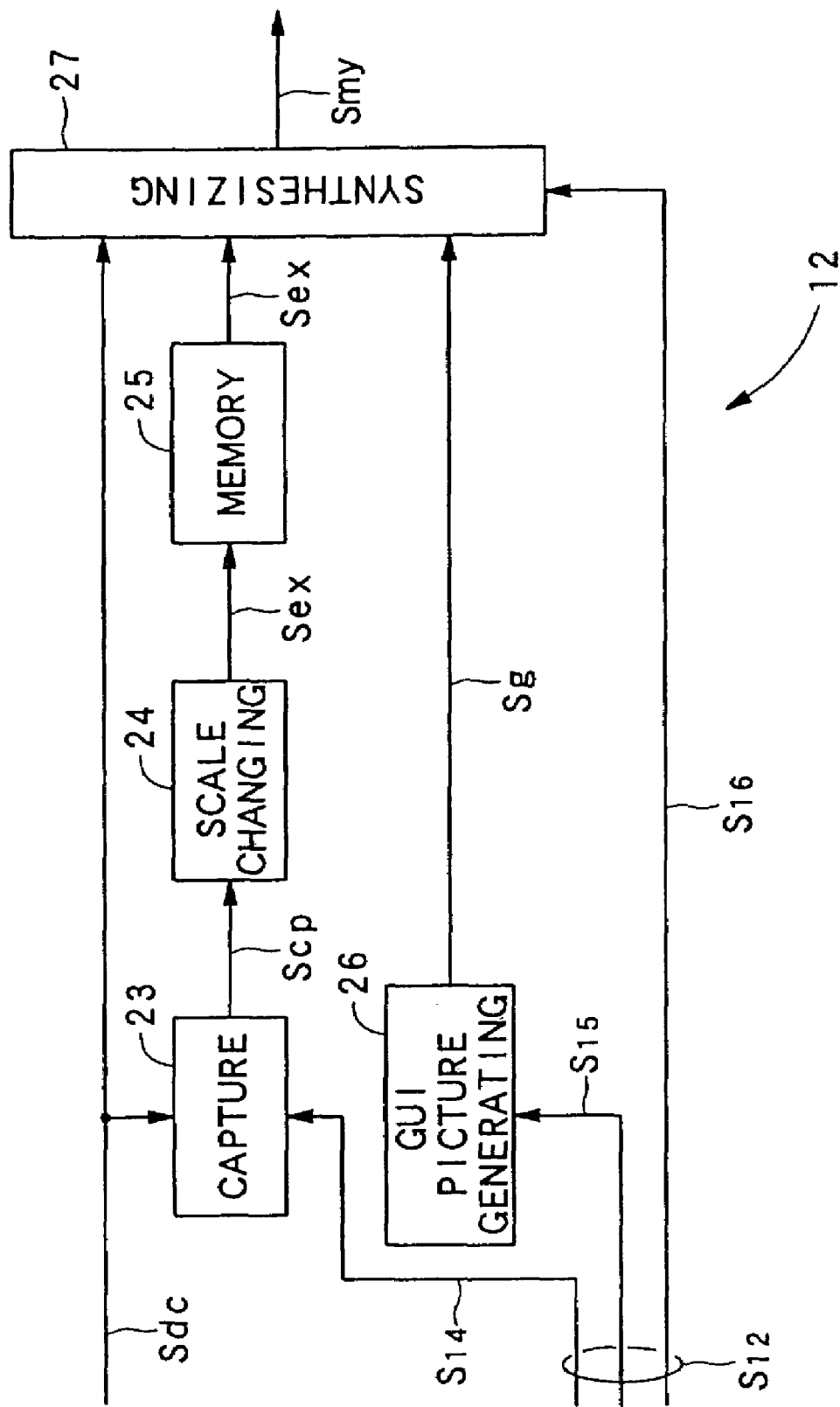
FIG. 3 is a block diagram showing a detailed configuration of a menu picture generating circuit of the embodiment.

As shown in FIG. 3, the menu picture generating circuit 12 includes a capturing unit 23, a scale changing unit 24, a memory 25, a GUI (Graphical Users Interface) picture generating unit 26 and a synthesizing unit 27.

Next, the schematic operations of the respective elements will be described below with reference to FIGS. 1 to 3.

At first, a case is described in which recording information, specifically including both picture information and voice information, supplied from an external unit is recorded on the optical disc 1.

When an information signal Sin corresponding to the information to be recorded is inputted and the recording button 20b is actuated in the operation unit 20, at first the A/D converter 3 digitizes the information signal Sin, generates a digital signal Sd, and outputs it to the MPEG encoder 4.

The MPEG encoder 4, in accordance with a control signal S7 outputted by the CPU 17, compresses the input digital signal Sd by using MPEG 2 method to generate a compression signal Se, and then outputs it to the multiplexers 5, 10.

The multiplexer 5, in accordance with a control signal S5 outputted by the CPU 17, switches the inputted compression signal Se and a later-described buffer signal Sbo, as necessary, to generate a switching recording signal Smr, and then outputs it to the record encoder 6.

The record encoder 6, in accordance with a control signal S3 outputted by the CPU 17, performs a so-called formatting process for converting the format of the switching recording signal Smr into the format for recording on the optical disc 1, then generates a record encode signal Sre, and outputs it to the recording circuit 7.

In timely parallel with this operation, the record encoder 6 outputs to the CPU 17 a record address signal Sra indicative of a position on the optical disc 1 of a later-described record signal Sr to be recorded (namely, a position on the optical disc 1 at which the information is to be recorded) in accordance with the record encode signal Sre, as necessary, based on the control signal S3.

Next, the recording circuit 7, in accordance with a control signal S2 outputted by the CPU 17, converts the input record encode signal Sre into a record signal Sr for recording, and outputs it to the pickup 2. At this time, the recording circuit 7 performs a so-called write strategy and the like on the record encode signal Sre in order to form a pit having a shape accurately corresponding to the information to be recorded on a later-described optical disc 1.

After that, the pickup 2, in accordance with the record signal Sr outputted by the recording circuit 7, drives a light source of a semiconductor laser or the like (not shown) in the pickup 2, generates a light beam B such as a laser light or the like and irradiates it onto an information recording surface of the optical disc 1. Thus, the pickup 2 forms pits corresponding to the record signal Sr, and thereby records the record signal Sr on the optical disc 1. During the recording, the optical disc 1 is rotated at a predetermined rotation number by the spindle motor 16 which is driven in accordance with a later-described spindle control signal Ssm. The pits corresponding to the record signal Sr are formed on the optical disc 1, for example, by using a phase changing method, and thus the record signal Sr is recorded.

On the other hand, the compression signal Se outputted to the multiplexer 10 is passed through the multiplexer 10, and outputted to the MPEG decoder 11 as a reproduction switch signal Smp.

Then, the MPEG decoder 11, in accordance with a control signal S9 outputted by the CPU 17, applies an extending process based on the MPEG 2 method onto the input reproduction switch signal Smp (which is the compression signal Se itself when the information is recorded), and then outputs it as a decode signal Sdc to the menu picture generating circuit 12, the still picture encoder 14 and one input terminal of the switch 22.

Next, the still picture encoder 14, in accordance with a control signal S11 outputted by the CPU 17, encodes as a still picture a picture selected to update a picture within a menu picture M by using a later-described process from a picture information included in the input decode signal Sdc, and then outputs it to one input terminal of the switch 21 as a still picture encode signal Sse.

Then, the switch 21, in accordance with a control signal S10 outputted by the CPU 17, switches between the still picture encode signal Sse and a later-described address information signal Sadd outputted by the CPU 17, and then outputs it to the buffer 15 as a switch signal Sbe.

Thus, the buffer 15, in accordance with a control signal S8 outputted by the CPU 17, temporarily stores therein the switch signal Sbe, and also reads out and outputs it to the multiplexer 5 as the buffer signal Sbo.

On the other hand, at the time of recording information, the switch 22 is switched to the side of the decode signal Sdc, in accordance with a control signal S13 outputted by the CPU 17.

Thus, the decode signal Sdc is outputted to the D/A converter 13 from the switch 22 as a switch signal Sch.

Next, the D/A converter 13 converts the switch signal Sch into an analog signal to generate an output signal Sout corresponding to the information signal Sin, and then outputs it to an external monitor and a speaker (not shown) which will be described later.

At this time, the CPU 17 generates the respective control signals S2, S3, S5, S7, S8, S10, S11 and S13 when recognizing the actuation of the record button 20b in the operation unit 20 in accordance with a command signal Sc from the operation unit 20. Then, the CPU 17 outputs those control signals to the above-mentioned respective elements, and further controls the respective operations for the above-mentioned recording.

The series of above-mentioned operations during the information recording enables the picture or voice corresponding to the recording signal Sr to be recorded while it is monitored in real time. It is noted that the menu picture generating circuit 12 is not actuated when the information is recorded.

Next, the operation of reproducing the information recorded on the optical disc 1 will be described below.

At a time of reproduction, when the reproduction button 20d is actuated in the operation unit 20, the pickup 2 irradiates the light beam B for the reproduction onto the rotating optical disc 1, generates a detection signal Sp corresponding to the pits formed on the optical disc 1 in accordance with the reflected light, and then outputs it to the reproducing circuit 8.

The reproducing circuit 8, in accordance with a control signal S1 outputted by the CPU 17, amplifies the detection signal Sp by a predetermined amplification factor, re-shapes its waveform to generate a reproduction signal Spp, and outputs it to the reproduction decoder 9.

Then, the reproduction decoder 9, in accordance with a control signal S4 outputted by the CPU 17, performs an unformatting process corresponding to the formatting process performed in the record encoder 6 onto the input reproduction signal Spp to generate a reproduction decode signal Spd, and then outputs it to the multiplexer 10.

In parallel with this operation, the reproduction decoder 9 outputs to the CPU 17 a reproduction address signal Spa indicative of a position on the optical disc 1 at which the reproduction signal Spp corresponding to the generated reproduction decode signal Spd is recorded (namely, a position on the optical disc 1 at which the reproduced information is recorded), as necessary, based on the control signal S4.

Next, the multiplexer 10, in accordance with a control signal S6 outputted by the CPU 17, passes the inputted reproduction decode signal Spd to the MPEG decoder 11 as the reproduction switch signal Smp.

The MPEG decoder 11, in accordance with a control signal S9 outputted by the CPU 17, performs the extending process on the input reproduction switch signal Smp to generate the decode signal Sdc, and then outputs it to the menu picture generating circuit 12, the still picture encoder 14 and one input terminal of the switch 22.

After that, the still picture encoder 14, the switch 21 and the buffer 15 perform the above-mentioned operations on the decode signal Sdc, and output the buffer signal Sbo to the multiplexer 5.

The multiplexer 5, the record encoder 6, the recording circuit 7 and the pickup 2 record only the buffer signal Sbo by using a later-described process on the optical disc 1, when the information is reproduced. At this time, the pickup 2 uses the time period in which the generated detection signal Sp is accumulated in a buffer (not shown) and then the accumulated detection signal Sp is outputted from the buffer (not shown) at a speed slower than an accumulation speed (namely, the time period in which the generation of the detection signal Sp is not required) to record the buffer signal Sbo as the record signal Sr on the optical disc 1.

On the other hand, the menu picture generating circuit 12, in accordance with a control signal S12 outputted by the CPU 17, uses a picture included in the input decode signal Sdc and designated by the control signal S12 to generate a menu picture M to select a program to be reproduced when the information is reproduced, and then outputs as a menu signal Smy to the other input terminal of the switch 22.

Then, the switch 22, in accordance with a control signal 13 outputted by the CPU 17, switches between the inputted menu signal Smy and the decode signal Sdc, and outputs one of them as the switch signal Sch to the D/A converter 13.

By this, the D/A converter 13 converts the switch signal Sch into an analog signal to generate an output signal Sout including either the menu picture M corresponding to the menu signal Smy or the information signal Sin, and then outputs it to the external monitor and the speaker (not shown) which will be described later.

At this time, the CPU 17 generates the respective control signals S, S4, S6, S9, S12 and S13 when recognizing the actuation of the reproduction button 20d in the operation unit 20 in accordance with the command signal Sc from the operation unit 20, and then outputs them to the above-mentioned respective elements, and further controls the respective operations for the above-mentioned reproduction.

Associated with the above-mentioned operations of the information recording and the information reproduction carried out by the respective elements, the CPU 17 outputs the respective control signals S1 to S13 to execute processes indicated by a later-described flowchart, respectively, in accordance with the record address signal Sra, the reproduction address signal Spa or the like.

In timely parallel with the respective operations of those information recording and information reproduction, the CPU 17 generates a control signal Ss for performing a servo-control on the spindle motor 16 and the pickup 2, and outputs it to the servo circuit 18. The servo circuit 18 generates the spindle control signal Ssm for controlling the rotation of the spindle motor 16 based on the control signal Ss, and then outputs it to the spindle motor 16. The servo circuit 18 also generates a pickup control signal Ssp for performing a so-called tracking servo control and focus servo control in the pickup 2, and then outputs it to the pickup 2. Then, the pickup 2, in accordance with the pickup control signal Ssp, performs the tracking servo control and the focus servo control on the light beam B simultaneously with recording the record signal Sr or detecting the signal Sp.

It in noted that the information necessary for a user to control the above-mentioned operation of the information recording and reproducing apparatus S is displayed on the display 19 in accordance with a display signal Sdp from the CPU 17.

Next, the operations of the respective elements in the menu picture generating circuit 12 at the time of the information reproduction will be described below with reference to FIG. 3.

As shown in FIG. 3, the capturing unit 23 in the menu picture generating circuit 12, in accordance with a control signal S14 included in the control signal S12 outputted by the CPU 17, temporarily stores therein a signal corresponding to a picture used to form the menu picture M in the input decode signal Sdc, and then outputs it to the scale changing unit 24 as a capture signal Scp.

Then, the scale changing unit 24 changes the scale of the picture included in the capture signal Scp to a scale necessary and appropriate for the configuration of a menu picture M, and outputs it to the memory 25 as a scale signal Sex.

After that, the memory 25 temporarily stores therein the scale signal Sex, and then outputs it to the synthesizing unit 27.

On the other hand, the GUI picture generating unit 26, in accordance with a control signal S15 included in the control signal S12, generates a picture (a so-called icon, button or the like) necessary for the configuration of menu pictures M except for the picture included in the scale signal Sex, and outputs it to the synthesizing unit 27 as a picture signal Sg.

The synthesizing unit 27, in accordance with a control signal S16 included in the control signal S12, uses the scale signal Sex, the picture signal Sg and the decode signal Sdc to generate the menu pictures M, and outputs it to the switch 22 as the menu signal Smy.

(II) Program Recording or Reproduction

The information recording or the information reproduction by a unit of a program according to the present invention will be described below with reference to FIGS. 1 to 6.

At first, the operation of recording an information by the unit of the program in the information recording and reproducing apparatus S will be described below with reference to FIGS. 1 to 6. Here, the information recording operation as described below is executed for each recording information every time the recording information is recorded.

In the following explanation, the "program" means a unit of recording information to be recorded on the optical disc 1 or recorded information already recorded on the optical disc 1 (actually, a unit of a picture or the like to be continuously recorded or reproduced).

In addition to the recording area at which the above-mentioned programs are recorded, the optical disc 1 in the embodiment has a title area (set for each program) that records therein a picture which is intended to constitute a menu picture used for selecting a program to be reproduced when the programs are reproduced and is also suitable for recognizing the respective programs (actually, a picture representative of the contents of the respective programs).

At the time of the information recording in the embodiment, the switch 21 is always switched to the side of the still picture encode signal Sse.

Figure 4A:
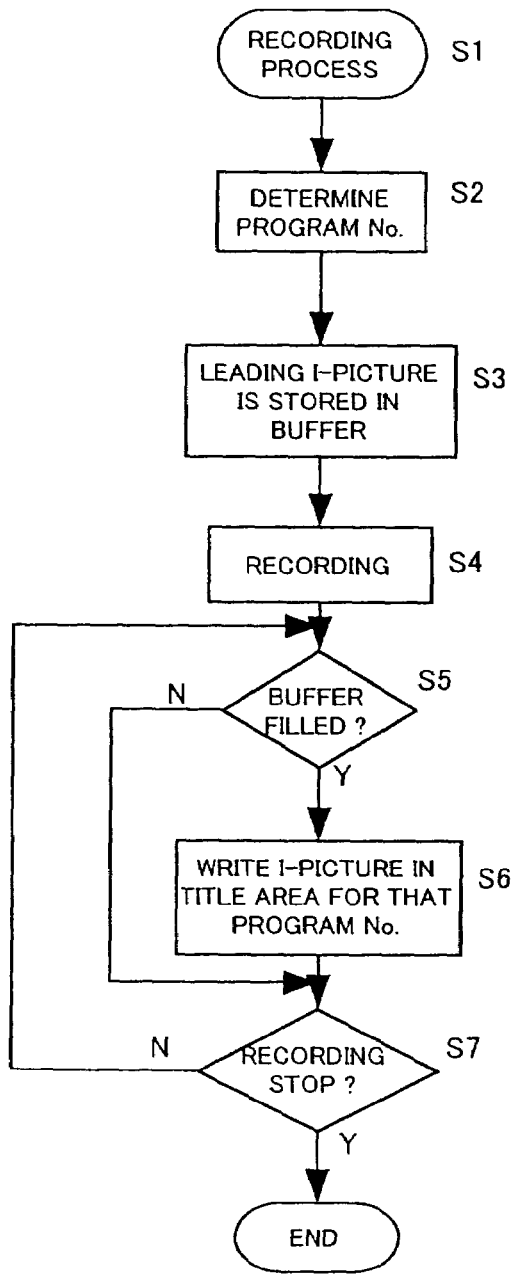
FIG. 4A is a flowchart showing an entire operation of an information recording process.

At first, the entire operation of the information recording is described with reference to FIGS. 1 and 4A.

When the information recording operation is started by the actuation of the record button 20b in the operation unit 20 of the embodiment (Step S1), a program number of a program to be recorded is determined (Step S2). In determining this program number, a user may designate it by actuating the operation unit 20 so that the CPU 17 recognizes it. Alternatively, when the information is recorded, the CPU 17 may read out a related information of the program already recorded on the optical disc 1 (for example, an address information indicative of a number and a name of each program, a position recorded on the optical disc 1 and the like) and automatically give a new number other than the existing numbers to the program to be recorded. Associated with the determination of the program number, a new title area is reserved on the optical disc 1 (a title area corresponding to a program having that program number).

When the program number is determined, an input of the information signal Sin corresponding to the program to be recorded is started, and the A/D conversion process in the A/D converter 3 and the compression process in the MPEG encoder 4 are started under the control of the CPU 17. Also, an I-picture (that is the abbreviation of an Intra-coded-picture (intra-frame coding picture) and is one unit containing a picture information from which one completed picture can be reproduced according to the picture compression process based on the MPEG 2 method) indicative of an leading picture in the program is supplied through the multiplexer 10 to the MPEG decoder 11. After the execution of the extension in the MPEG decoder 11, the leading picture is encoded as a still picture corresponding to the I-picture in the still picture encoder 14. Then, a corresponding switch signal Sbe is temporarily stored in the buffer 15 through the switch 21 (Step S3).

Then, the process for recording the recording signal Sr based on the continuously inputted information signal Sin is executed (Step S4).

Next, it is judged whether or not the buffer 15 is filled with the switch signal Sbe (namely, the switch signal Sbe corresponding to still picture within the program to be recorded) (Step S5). If it is not filled (Step S5; No), the operational flow proceeds to step S7.

On the other hand, in the judgment at the step S5, if the buffer 15 is filled with the switch signal Sbe (Step S5; Yes), the I-picture in the switch signal Sbe accumulated in the buffer 15 is recorded in the title area reserved for the program number determined at the step S2 (Step S6). In this case, the buffer signal Sbo is recorded at the corresponding title area by the pickup 2 through the record encoder 6 and the recording circuit 7. Next, it is judged whether or not the stop button 20c is actuated in order to indicate the end of the record operation in the operation unit 20 (Step S7). If it is actuated (Step S7; Yes), the recording process is ended. If it is not actuated (Step S7; No), the operational flow goes back to the step S4 in order to continue the recording process.

Next, the interrupting process carried out during the entire operation shown in FIG. 4A will be described below with reference to FIG. 4B. The interruption by the interrupting process shown in FIG. 4B occurs in the operation shown in FIG. 4A during the period until the start of the step S6 after the start of the step S4.

Figure 4B:
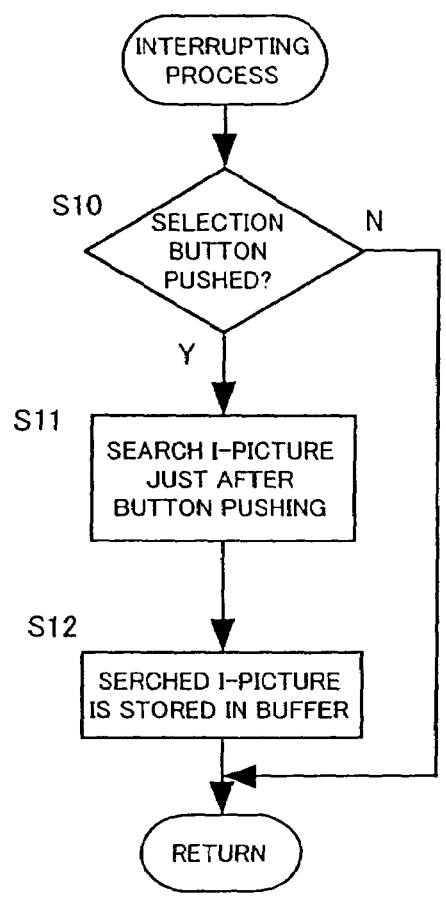
FIG. 4B is a flowchart showing an operation of an interrupting process.

The interrupting process shown in FIG. 4B is started by the actuation of the screen selection button 20a in the operation unit 20 by a user. That is, the CPU 17 always monitors whether or not the screen selection button 20a is actuated until the start of the step S6 after the start of the step S4 shown in FIG. 4A.

If it is not actuated (Step S10; No), the process returns to the operation shown in FIG. 4A. If it is actuated (Step S10; Yes), an I-picture corresponding to a picture inputted at or just after the actuated timing of the selection button 20a is searched for from the inputted decode signal Sdc in the MPEG encoder 4 (Step S11).

Then, a still picture corresponding to the searched I-picture is stored as the switch signal Sbe in the buffer 15 through the MPEG encoder 4, the multiplexer 10, the still picture encoder 14 and the switch 21 (Step S12). Then, the operational flow returns to the original operation shown in FIG. 4A. At this time, if a switch signal Sbe indicative of a still picture corresponding to another I-picture has already been stored in the buffer 15, it is overwritten by the switch signal Sbe indicative of the still picture corresponding to the searched I-picture.

After the above-mentioned execution of the interrupting process, by executing the process at the step S6, the picture in the program desired by the user, who records the program, is recorded in the title area within the optical disc 1 as the picture representative of that program.

Next, the entire operation in the reproduction for each program recorded on the optical disc 1 will be described below with reference to FIGS. 1, 3, 5 and 6. Here, the following information reproduction is executed for each program.

Figure 5A:
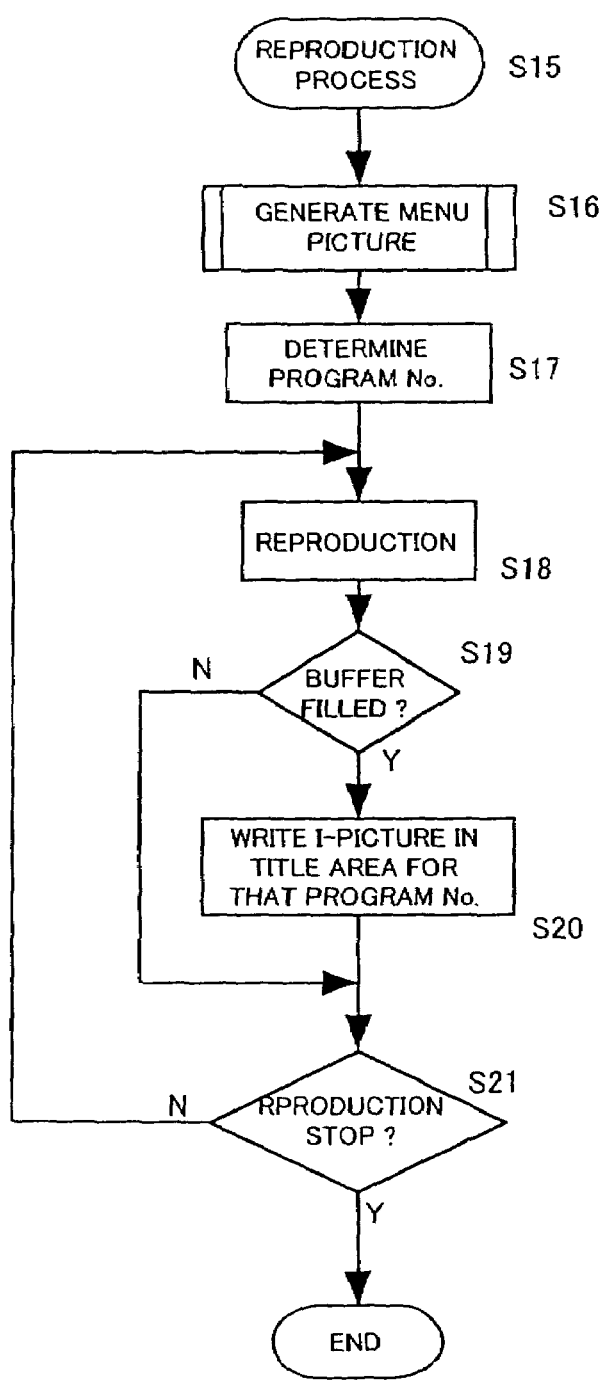
FIG. 5A is a flowchart showing an entire operation of an information reproduction process.

At first, as shown in FIG. 5A, when the information reproduction is started by the actuation of the reproduction button 20d indicative of the reproduction start in the operation unit 20 of the embodiment (Step S15), the I-pictures corresponding to the respective programs recorded in the title areas on the optical disc 1 are firstly detected by the menu picture generating circuit 12 through the pickup 2 and the like. The I-pictures corresponding to the detected respective programs are used to generate the menu pictures M (Step S16). At this time, it is assumed that the buffer signals Sbo (record signals Sr) indicative of the I-pictures corresponding to the leading pictures of the respective programs has already been recorded, as an initial setting, in respective areas T1, T2, T3, . . . on the optical disc 1, as shown on a left side of FIG. 6A.

Also, the switch 22 is already switched to the side of the menu picture generating circuit 12. The menu signal Smy corresponding to the generated menu picture M is outputted as the switch signal Sch through the D/A converter 13 to an external monitor. Moreover, actually as for the menu picture M, pictures M1 to M6 indicative of the respective programs are displayed within the menu picture M, for example, as shown on a right side of FIG. 6A.

When the menu picture M is generated and displayed, a program to be reproduced is determined by the user actuating the operation unit 20 in accordance with the displayed menu picture M (Step S17). At this time, the program to be reproduced is selected by actuating the portions corresponding to the respective pictures M1 to M6 in the menu picture M shown on the right side of FIG. 6A on the operation unit 20.

If the program is selected, the switch 22 is then switched to the side of the decode signal Sdc. Also, the pickup 2 starts generating the detection signal Sp corresponding to the program to be reproduced. The reproducing circuit 8, the reproduction decoder 9, the multiplexer 10, the MPEG decoder 11, the switch 22 and the D/A converter 13 start the output of the output signal Sout corresponding to the program to be reproduced (Step S18). In timely parallel with this operation, when the user actuates the screen selection button 20a during the reproduction, the still picture encoder 14 encodes the I-picture to be reproduced at or just after the actuated timing, and sequentially stores that I-picture as the switch signal Sbe through the switch 21 in the buffer 15.

Next, it is judged whether or not the buffer 15 is filled with the switch signal Sbe (namely, the switch signal Sbe corresponding to one of still pictures within the program to be reproduced) (Step S19). If it is not filled (Step S19; No), the operational flow proceeds to step S21.

On the other hand, in the judgment at the step S19, if the buffer 15 is filled with the switch signal Sbe (Step S19; Yes), the switch signal Sbe (I-picture) accumulated in the buffer 15 is then recorded in the title area on the optical disc 1 corresponding to the program number determined at the step S17 (Step S20). In this case, similarly to the case of the information recording, the buffer signal Sbo is recorded in the corresponding title area by the pickup 2 through the multiplexer 5, the record encoder 6 and the recording circuit 7.

Next, it is judged whether or not the stop button 20c is actuated in order to indicate the end of the reproduction operation in the operation unit 20 (Step S21). If it is actuated (Step S21; Yes), the reproducing process is ended. If it is not actuated (Step S21; No), the operational flow goes back to the step S4 in order to continue the reproduction process.

Here, similarly to in the information reproducing operation by the information recording and reproducing apparatus S of the embodiment, the interrupting operation as shown in FIG. 4B is executed. In this case, the interrupting process occurs during the time period until the start of the step S20 after the start of the step S18.

Also, when the information is reproduced, the CPU 17 always monitors whether or not the screen selection button 20a is actuated until the start of the step S20 after the start of the step S18 shown in FIG. 5A. The actuation of the screen selection button 20a starts the interrupting process shown in FIG. 4B. The content of the interrupting process is the same as that of the interrupting process shown in FIG. 4B. Thus, the detailed explanation is omitted.

The process at the step S20 is executed after the executions of the interrupting process and the entire operation in the information reproduction as mentioned above. By this, even during the reproduction of the program, the picture in the program desired by the user, who carries out the reproduction, is recorded in the title area on the optical disc 1 as the picture representative of the program. If the same program is reproduced at a next time, the picture recorded in the title area is used to constitute the menu picture M.

Figure 5B:
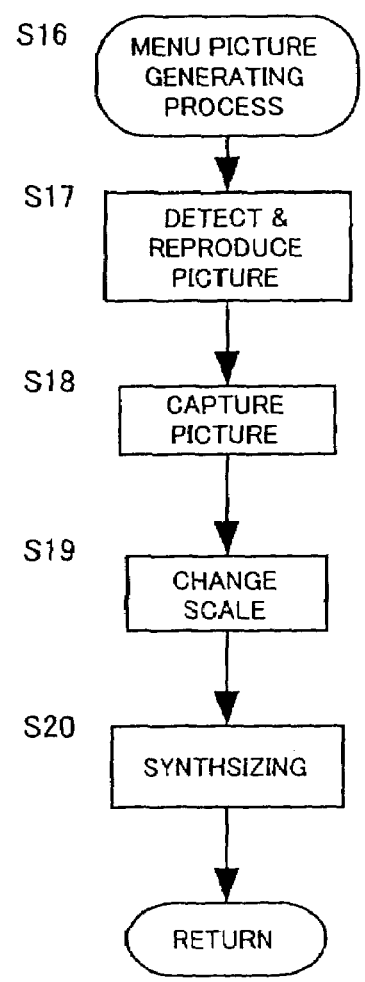
FIG. 5B is a flowchart showing an operation of a menu picture generating process.

Next, the process at the step S16 will be described below in detail with reference to FIGS. 3 and 5B.

In the process for generating a menu picture M at the step S16, when a picture (I-picture) to constitute a menu picture M is detected and reproduced (Step S25), a decode signal Sdc corresponding to the reproduced picture is inputted to the menu picture generating circuit 12, temporarily stored in the capture unit 23, and then outputted as a capture signal Scp to the scale changing unit 24 (Step S26).

Then, the scale changing unit 24 changes the scale of the capture signal Scp to the scale necessary for the configuration of the menu picture M, and outputs it through the memory 25 to the synthesizing unit 27 as a scale signal Sex.

Next, the synthesizing unit 27 uses the scale signal Sex, the picture signal Sg and the decode signal Sdc to generate the menu pictures M, and then outputs it to the switch 22 as the menu signal Smy (Step S28). Then the operational flow proceeds to the step S17.

Figure 6A:
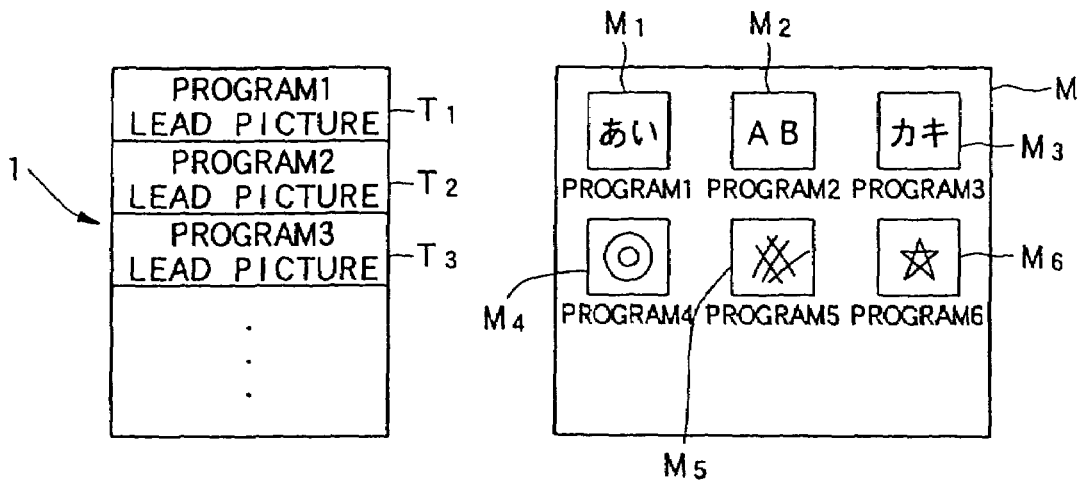
FIG. 6A is a view showing a configuration of a menu picture and a title area in an initial state.
Figure 6B:
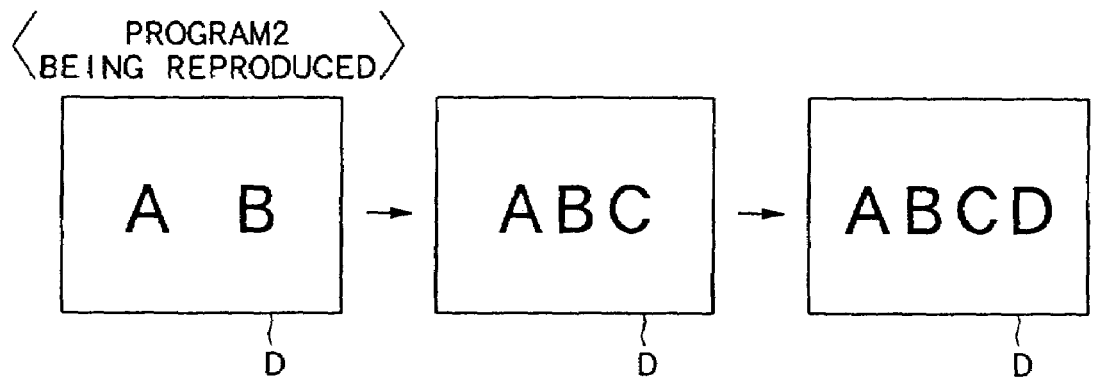
FIG. 6B is a view exemplifying a change of a picture during reproduction.

Here, the change of the title area and the change of the menu picture M when the operations at the steps S18 to S20 (which include the interrupting process shown in FIG. 4B) are executed will be described with reference to FIGS. 6A to 6C. For example, when a central picture (a picture containing characters "ABC") shown in FIG. 6B is displayed on a monitor D during the reproduction of a program-2 (step S18) as shown in FIG. 6B, if a user actuates the screen selection button 20a to use the picture as the menu picture M indicative of the program-2 (Step S10; Yes), an I-picture indicative of the picture is searched for (Step S11) and stored in the buffer 15 (Step S12). After that, the I-picture within the buffer 15 is recorded in a title area T2 shown on a left side of FIG. 6C (Step S20), and thus the title area T2 is updated.

Figure 6C:
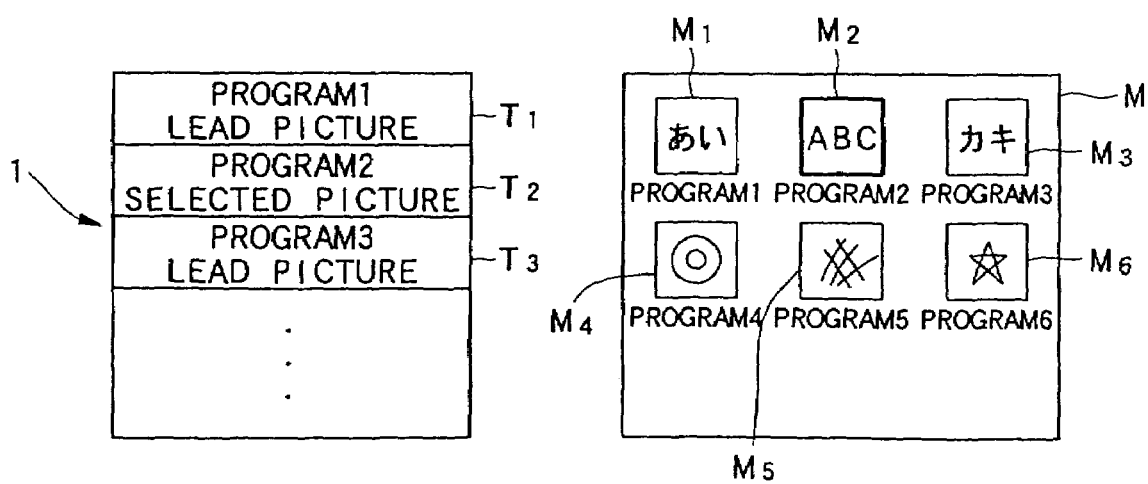
FIG. 6C is a view showing a configuration of a menu picture and a title area after updating.

Then, when the program recorded on the optical disc 1 is again reproduced after the updating of the title area T2, the menu picture M shown on the right side of FIG. 6C is displayed (Step S16). At this time, on the newly displayed menu picture M, the picture M2 corresponding to the program-2 is shown in place of the picture (i.e., the picture shown on the center of FIG. 6B) which was displayed when the screen selection button 20a is actuated.

In the above described embodiment, the I-picture itself corresponding to the picture representative of each program is recorded in the corresponding title area. Alternatively, the embodiment may be designed such that the picture representative of each programs are recorded not at the title area but at other area and an address information on the optical disc 1 indicating a recorded position of the picture representative of each program is recorded in the corresponding title area so that the representative picture is designated in accordance with the address information.

(III) Information Reproduction Using Play List

An information reproduction using a play list according to the present invention will be described below with reference to FIGS. 7 to 12.

Here, the play list serving as a reproduction control information is reproduction control information that is used to select a plurality of parts (parts in one program) as a partial recording information to be arbitrarily reproduced by the user from the respective programs if the plurality of above-mentioned programs are recorded on the optical disc 1 and to arrange them in an arbitrary order to successively reproduce them. Actually, the reproduction control information included a recording start time and a recording ending time on the optical disc 1 of each part in respective reproduction orders. Also, the play lists are collectively recorded, for example, within areas of an outside of and very close to a management area for recording therein a management information for a reproduction management in the optical disc 1.

Figure 7:
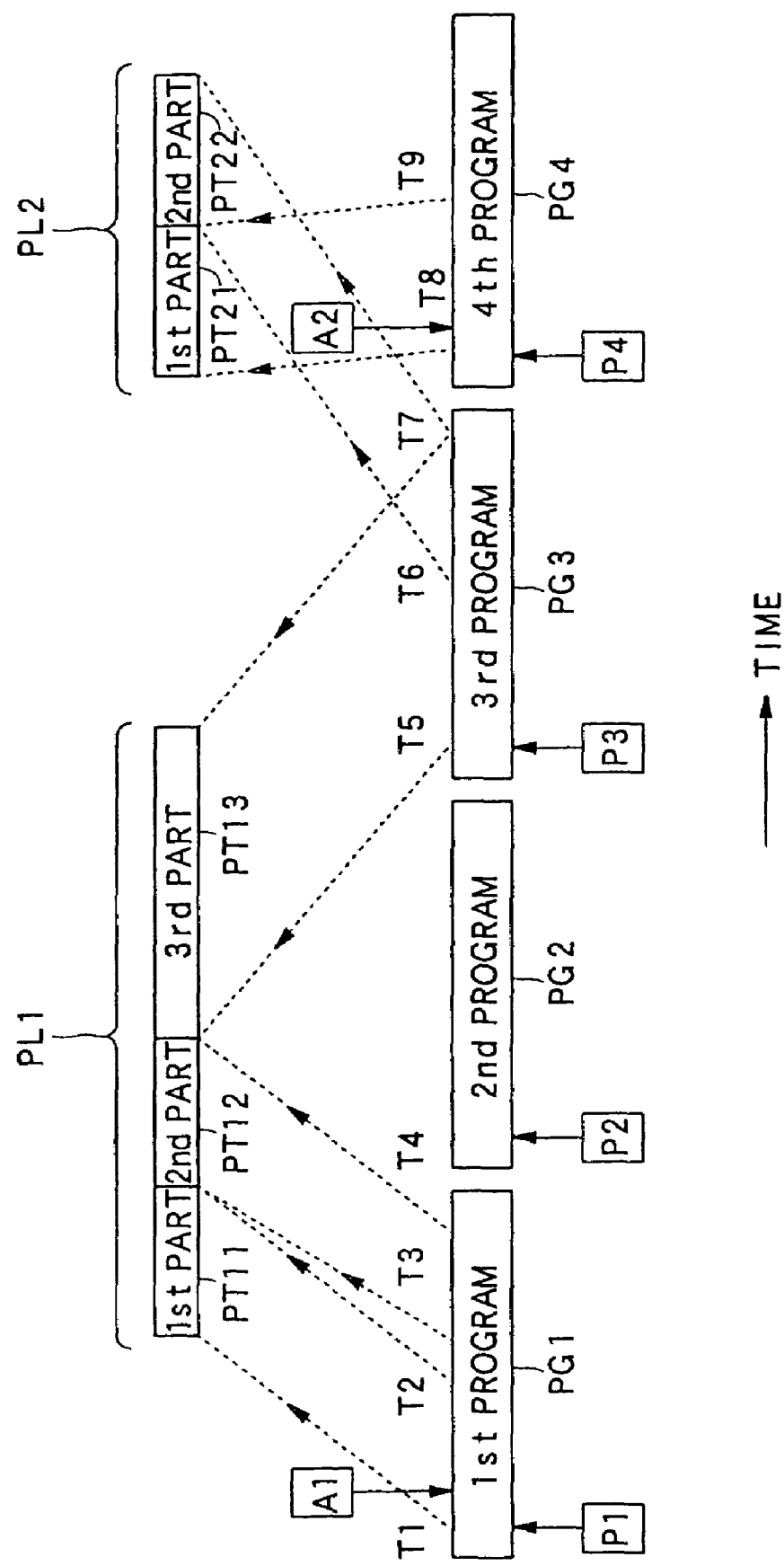
FIG. 7 is a diagrammatic view showing a schematic configuration of a play list according to the embodiment.

The play list will be actually described below with reference to FIG. 7. FIG. 7 is a diagrammatic view exemplifying the configuration of the play list.

As mentioned above, the play list includes the information with regard to the reproduction order, and does not include the picture information itself to be actually reproduced.

That is, as shown at the bottom of FIG. 7, assuming that there are four programs from a first program PG1 to a fourth program PG4 as the programs recorded on the optical disc 1 independently of each other, the above-mentioned reproduction for each program is executed such that each of the first program PG1 to the fourth program PG4 is one unit. At this time, the picture denoted by a symbol "P1" to the picture denoted by a symbol "P4" for each program are respectively recorded in each of the above-mentioned title areas.

On the contrary, in the example shown in FIG. 7, as shown at the top of FIG. 7, a first play list PL1 according to the present invention is defined as a reproduction control information to successively reproduce an information continuing from the time T1 to the time T2 within the first program PG1, an information continuing from the time T3 to the time T4 within the first program PG1, and an information continuing from the time T5 to the time T7 within a third program PG3, in this order.

At this time, in the first play list PL1, the information continuing from the time T1 to the time T2 within the first program PG1 is defined as a first part PT1 1, the information continuing from the time T3 to the time T4 within the first program PG1 is defined as a second part PT1 2, and the information continuing from the time T5 to the time T7 within the third program PG3 is defined as a third part PT1 3, respectively.

On the other hand, as shown at the top of FIG. 7, a second play list PL2 is defined as a reproduction control information to successively reproduce an information continuing from the time T8 to the time T9 within a fourth program PG4, and an information continuing from the time T6 to the time T7 within the third program PG3, in this order.

At this time, in the second play list PL2, the information continuing from the time T8 to the time T9 within the fourth program PG4 is defined as a first part PT2 1, and the information continuing from the time T6 to the time T7 within the third program PG3 is defined as a second part PT2 2, respectively.

In the respective play lists, the addresses of the recording positions on the optical disc 1 of the leading pictures (pictures designated by symbols "A1", "A2" of FIG. 7) indicative of contents of corresponding respective programs are stored at the heads of the respective first parts, as the designation information indicative of the leading pictures.

The use of the play lists having the configuration shown in FIG. 7 enables the user to automatically reproduce the first part PT1 1 to the third part PT1 3 in this order, for example, if the reproduction using the first play list PL1 is designated.

At this time, after continuously reproducing from the time T1 to the time T2 within the first program PG1, the information recording and reproducing apparatus S searches for the position of the time T3 within the first program PG1, and continuously reproduces the first program PG1 from the time T3 to the time T4. Then, the apparatus S searches for the position of the time T5 within the third program PG3, and reproduces the information continuing from the time T5 to the time T7.

Next, the operation of the information recording and reproducing apparatus S when the play list is newly generated will be described below with reference to FIGS. 8 and 9.

Figure 8:
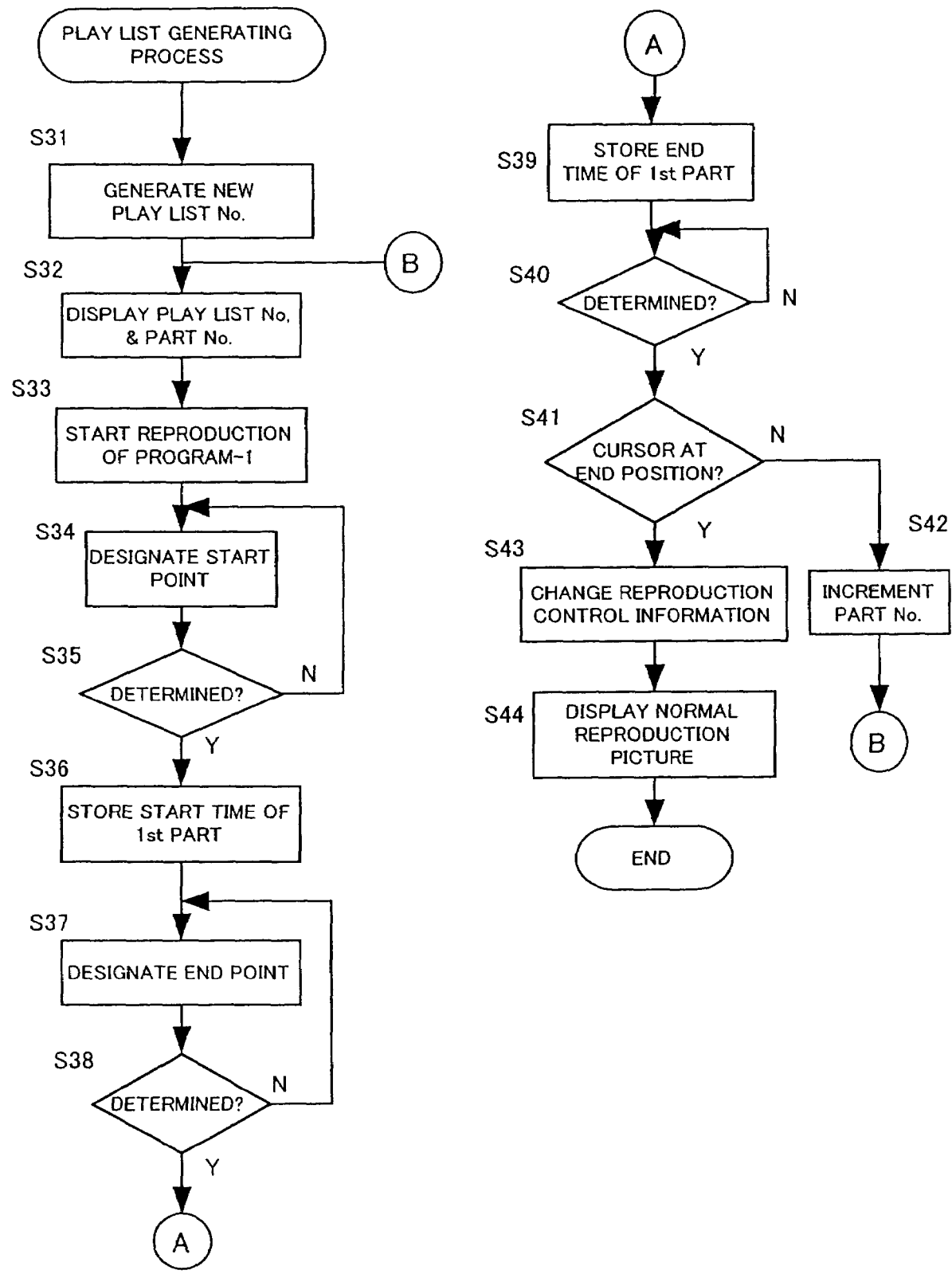
FIG. 8 is a flowchart showing a play list generating process.
Figure 9A:
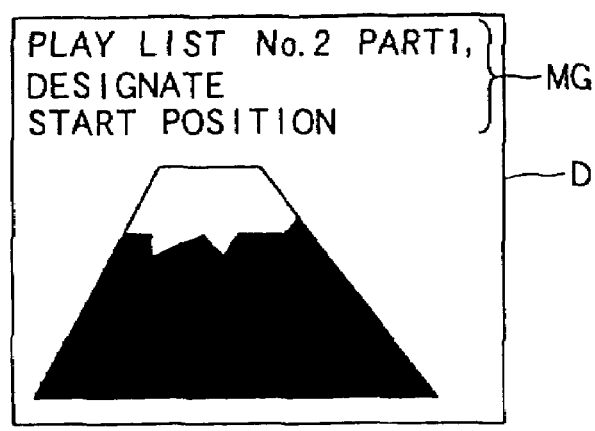
FIG. 9A is a first example of display showing the play list generating process.
Figure 9B:
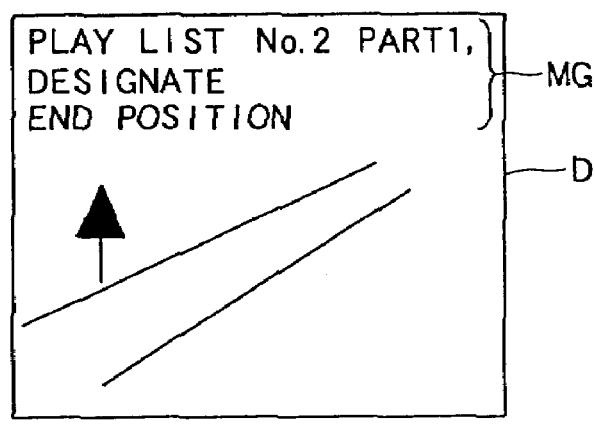
FIG. 9B is a second example of display showing the play list generating process.
Figure 9C:
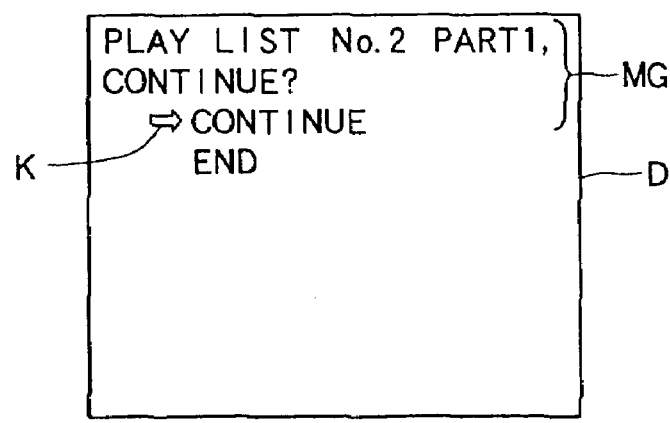
FIG. 9C is a third example of display showing the play list generating process.

FIG. 8 is a flowchart showing the operation (mainly, the operation controlled by the CPU 17) in the information recording and reproducing apparatus S when the play list is newly generated. FIGS. 9A to 9C are display examples on a monitor D to explain the process.

At first, the operation for generating the play list is described.

In the embodiment, if the play list is newly generated, a number obtained by adding "1" to the total number of existing play lists stored in the register (not shown) of the CPU 17 is firstly stored in the register as a number of a play list to be newly generated. Also, a parameter indicative of a number of a part to be included in the play list to be newly generated is defined as "1" (hereafter, the parameter is merely referred to as a part number) (Step S31).

Next, the number of the play list which is newly generated and stored in the register at the step S31 as well as the part number to be included in that play list are displayed together with a phrase of "Please, Designate Start Position" as a message MG in a manner superimposed on the reproduction picture on the monitor D, as shown in FIG. 9A (Step S32).

Then, the reproduction is started from the first program recorded on the optical disc 1 (Step S33). Next, the user actuates the stop button 20c within the operation unit 20, the quick feedback button 20e, the quick feed forward button 20f, the quick feedback stop button 20g, the quick feed forward stop button 20h and the pause button 20q to select the picture to be registered as the leading picture indicative of the start position of the first part within the new play list (Step S34).

After that, in accordance with a fact that the determination button 20m is pushed down during the selection operation, it is judged whether or not the picture to be registered as the leading picture is selected and determined (Step S35). If it is not pushed down (Step S35; No), the operational flow proceeds to the step S34 in order to execute the selection operation in succession. On the other hand, if it is pushed down (Step S35; Yes), a display start time of the picture (i.e., a display start time (for example, the time T1 in FIG. 7) calculated from the head of the information recorded on the optical disc 1) is stored in the register within the CPU 17 as the start time of the first part (Step S36). At this time, if the part number is "1", the above-mentioned picture (actually, the I-picture immediately after the start time, or the I-picture after an elapse of a predetermined time from the start time) becomes the leading picture of the corresponding program. Thus, the designation information indicative of this picture is stored in the register together with the start time of the first part.

When the start time of the first part is stored by the above-mentioned process, in order to set an ending time of the first part (namely, a display start time of a picture to be displayed at the end of the part), the number of the play list to be newly generated and the number "1" of the first part whose start time is stored at the step S36 are displayed on the monitor D, as shown in FIG. 9B, as a message MG together with a phrase of "Please Designate End Position".

The program reproduction is continued (the first program may be reproduced continuously, or the operational flow may proceed to the second program or after that). During this reproduction, the user actuates the stop button 20c, the quick feedback button 20e, the quick feed forward button 20f, the quick feedback stop button 20g, the quick feed forward stop button 20h and the pause button 20q to select the picture to be registered as the end picture indicative of the end position of the first part within the new play list (Step S37).

After that, in accordance with the fact that the determination button 20m is pushed down during the selection operation, it is judged whether or not the picture to be registered as the end picture is selected and determined (Step S38). If it is not pushed down (Step S38; No), the operational flow proceeds to the step S37 in order to execute the selection operation in succession. On the other hand, if it is pushed down (Step S38; Yes), a display start time of the picture is stored in the register within the CPU 17 as the end time of the first part (Step S39).

If the end time of the first part is stored by the above-mentioned process, in order to determine whether or not the generation of the new play list is ended, the picture reproduction currently being executed is interrupted. Also, the number of the play list currently being generated and the part number (both of them are "1" at this time) are displayed on the monitor D as the message MG together with a phrase of "Continue ?" and a cursor K shown in FIG. 9C (Step S39).

After that, it is checked whether or not the determination button 20m is pushed down (Step S40). If it is not pushed down (Step S40; No), the operational flow waits for the pushing operation. If it is pushed down (Step S40; Yes), it is then checked whether or not the position of the cursor K is the position of a phrase "End" (Refer to FIG. 9C) (Step S41). If it is the position of a phrase "End" (Step S41; Yes), in order to determine the play lists generated until that time, the designation information indicative of the leading pictures of the respective play lists and the start times and the end times of the respective parts stored in the register are stored in the collection of record areas adjacent to the management area on the optical disc 1, as the reproduction control information indicative of the generated play lists (Step S43). Then, the display on the monitor D is returned to the normal reproduction picture (Step S44), and the process for generating the new play list is ended.

On the other hand, if the position of the cursor K is not the position of the phrase "End" (Step S41; NO), in order to proceed to an operation for generating a reproduction control information for a next part, the part number is incremented by "1" (Step S42). Then, the operational flow returns to the step S2 to perform the above-mentioned operations for the second part.

Since the above-mentioned operations are repeated for a necessary number of times, the plurality of play lists each including the plurality of parts are completed.

Next, the operation for generating the play list will be actually described below with reference to the example of FIG. 7.

At first, as the premise of the explanation, a case is described in which the first play list PL1 shown in FIG. 7 is already recorded on the optical disc 1, and on the contrary, the second play list PL2 is newly generated.

At first, when the generation of the play list is designated on a play list generation designation picture (not shown) displayed on the monitor D (See. step S31 of FIG. 8), a picture shown in FIG. 9A is displayed on the monitor D (see. step S32 of FIG. 8). At this time, in the message MG, the number of the play list is automatically displayed as "2" (see. step S31 of FIG. 8), and the part number is automatically displayed as "1".

Then, the reproduction is started from the first program PG1 (see. step S33 of FIG. 8). Even during the reproduction, the message MG shown in FIG. 9A is continuously displayed.

After that, by actuating the quick feed forward button, the quick feedback button or the like, the portion which is desired to be reproduced by using the second play list PL2, namely, the vicinity of the time T8 of the fourth program PG4 in FIG. 7, is reproduced (see. step S34 of FIG. 8). When the determination button 20m is pushed down at the timing of the time T8 (see. step S35; YES), the start time of the first part PT21 is registered in the resister. At the same time, a play list generation end designation picture of FIG. 9B is displayed on the monitor D (see. step S36 of FIG. 8).

Similarly (see. step S37 of FIG. 8), if the determination button 20m is pushed down at the timing of the time T9 of the fourth program PG4 (see. step S38 of FIG. 8; YES), the reproduction from the time T8 of the fourth program PG4 to the time T9 as the first part PT2 1 of the second play list PL2 is registered in the register (see. step S39 of FIG. 8).

Next, a play list generation end/continuation picture shown in FIG. 9C is displayed on the monitor D (see. step S39 of FIG. 8). At this time, "Continuation" is designated (see. step S40 of FIG. 8; NO) to push down the determination button 20m (Step S40 of FIG. 8; YES). Accordingly, the picture shown in FIG. 9A is again displayed on the monitor D (see. step S2 of FIG. 8). At this time, the part number is displayed as "2" (see. step S42 of FIG. 8).

Thereafter, similarly, the times T6, T7 in the third program PG3 are registered as the start time and the end time of the second part PT2 2, respectively. Now, "End" is designated on the picture shown in FIG. 9C (see. step S40 of FIG. 8; YES) to push down the determination button 20*m* (see. step S40 of FIG. 8; YES).

By the above-mentioned operations, as the second play list PL2, the first part PT2 1 in which the start time is the time T8 and the end time is the time T9 and the second part PT2 2 in which the start time is the time T6 and the end time is the time T7 are registered in the register, and then the operational flow returns to the normal picture display (see. step S44 of FIG. 8).

At this time, the CPU 17 controls to record the content of the registered second play list PL2 as the new play list on the optical disc 1 (see. step S43 of FIG. 8).

Similarly to the case of the above-mentioned reproduction for each program, when the reproduction picture is displayed on background even during the generation of the play list, if the screen selection button 20*a* is pushed down at the desired timing, an address of a picture displayed at the pushed down timing may be registered in the register, instead of the address of the leading picture, as an address of a picture indicative of a play list at that time.

Next, the process for editing the generated play list will be described below with reference to FIGS. 10A to 12E.

FIGS. 10A to 10E are diagrammatic views showing the concept of the process for editing the play list. FIG. 11 is a flowchart showing the process in the information recording and reproducing apparatus S when some of the parts within the play list is partially erased. FIGS. 12A to 12D are display examples on the monitor D to explain the process.

In the play list of this embodiment, the processes of addition, partial erasing, exchange and time change are possible as the editing process.

The respective editing processes will be schematically described below with reference to FIGS. 10A to 10E.

Figure 10A:
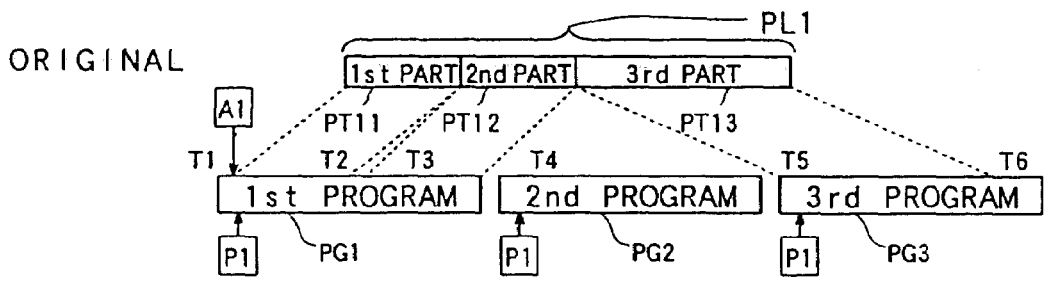
FIG. 10A is a diagrammatic view showing the play list before editing process.
Figure 11:
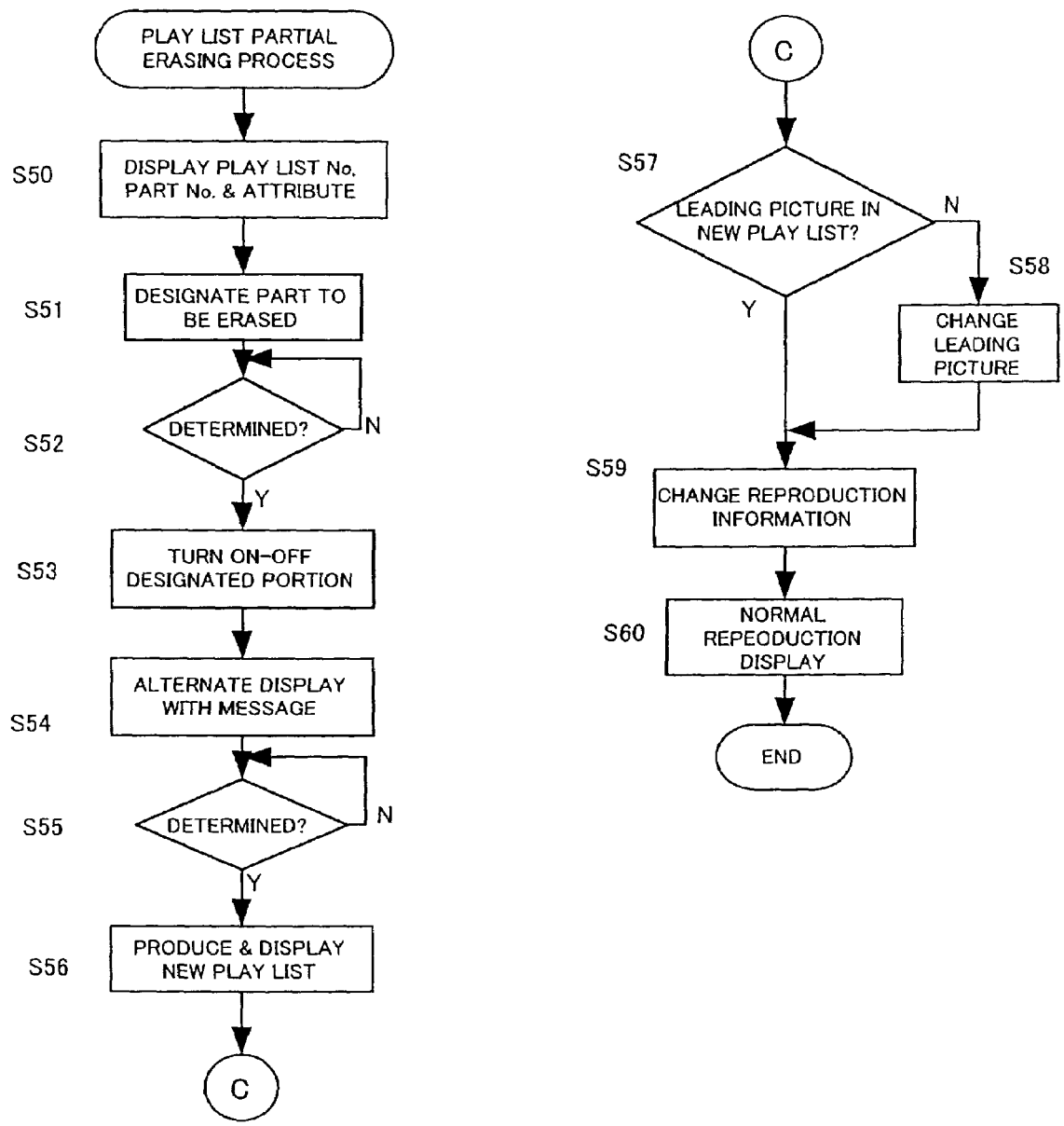
FIG. 11 is a flowchart showing a play list partially erasing process.

Here, FIG. 10A is a diagrammatic view showing an original first play list PL1 prior to the execution of the respective editing processes. Actually, in the first play list PL1, it is assumed that an information from a time T1 to a time T2 in a first program PG1 is reproduced as a first part PT1 1, and similarly an information from a time T3 to a time T4 is reproduced as a second part PT1 2, and further an information from a time T5 to a time T6 in a third program PG3 is reproduced as a third part PT1 3.

Figure 10B:
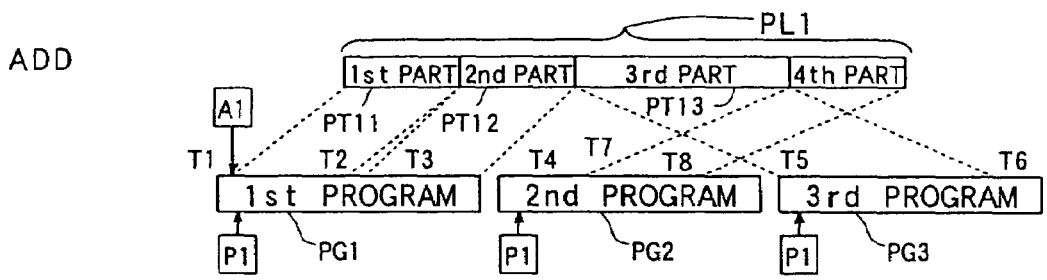
FIG. 10B is a view showing an adding process of the play list editing process.

Under this condition, in the process for adding to the first play list PL1, for example, as shown in FIG. 10B, it can be newly defined so as to continuously reproduce an information from a time T7 to a time T8 in a second program PG2 as a fourth part PT1 4 after the third part PT1 3.

Figure 10C:
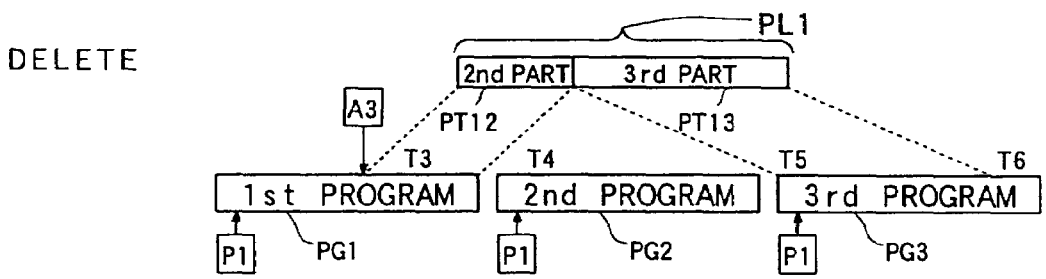
FIG. 10C is a view showing a partially erasing process of the play list editing process.

Next, in the process for partially erasing the first play list PL1, for example, as shown in FIG. 10C, it may be defined so as to erase an information corresponding to the first part PT1 1 from the original first play list PL1. In this case, it is re-defined such that the second part PT1 2 remaining as the first play list PL1 becomes a new first part in the first play list PL1 after the partial erasure, and the third part PT1 3 becomes a new second part in the first play list PL1 after the partial erasure.

Figure 10D:
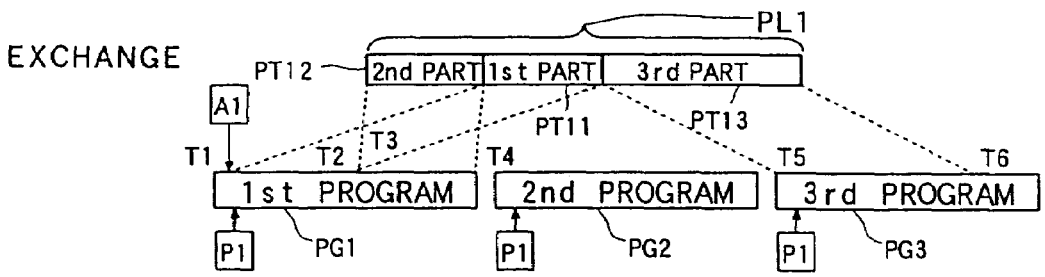
FIG. 10D is a view showing an exchanging process of the play list editing process.

In the process for exchanging the first play list PL, for example, as shown in FIG. 10D, it may be defined so as to exchange the order of reproducing the respective parts in the original first play list PL1, and firstly reproduce the second part PT1 2, next reproduce the first part PT1 1 and finally reproduce the third part PT1 3. In this case, as a first play list PL1 after the exchange, it is re-defined such that the second part PT1 2 becomes a first part after the exchange, and then the first part PT1 1 becomes a second part after the exchange, and further the third part PT1 3 becomes the third part in succession.

Figure 10E:
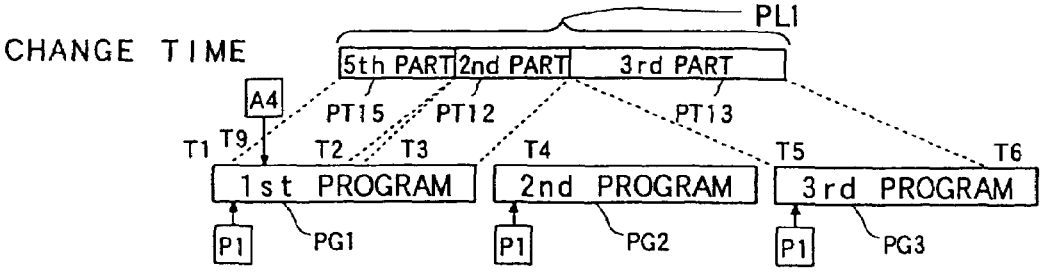
FIG. 10E is a view showing a time changing process of the play list editing process.

Finally, in the process for changing the time with regard to the first play list PL1, for example, as shown in FIG. 10E, it may be defined such that the content of the first part PT1 1 is newly constituted by an information from the time T9 to the time T2 in the first program PG1, and then this is reproduced prior to the second part PT1 2 as a fifth part PT1 5. In this case, as a first play list PL1 after the time change, it is re-defined such that the fifth part PT1 5 becomes a first part after the time change, and the second part PT1 2 and the third part PT1 3 become the second part and the third part.

Next, as the actual example of the editing process, the partially erasing process in the above-mentioned editing process will be exemplified and described below with reference to FIGS. 11, 12A to 12D.

At first, the operation for partially erasing the play lists is generally described.

Figure 12A:
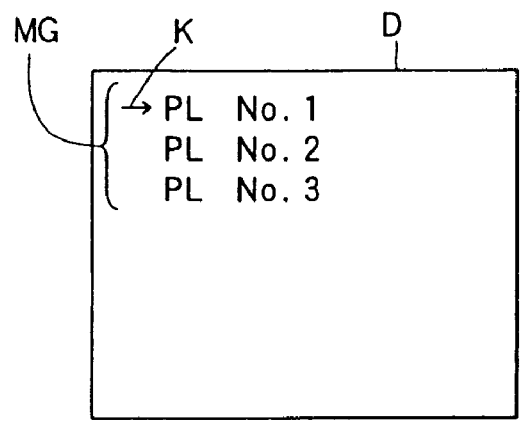
FIG. 12A is a first example of the play list partially erasing process.

In the embodiment, if the existing play lists are partially erased, the selection picture shown in FIG. 12A is firstly displayed on the monitor D by actuating the menu button 20*j*. Then, the cursor K on the message MG therein are moved by actuating the selection buttons 20*k*, 20*n*. Accordingly, a play list to be partially erased is selected. When the selection is completed, the selection picture (FIG. 12B) of the editing process corresponding to the selected play list is displayed, and the cursor K on the display picture is actuated to thereby select an item of the partial erasure.

Figure 12B:
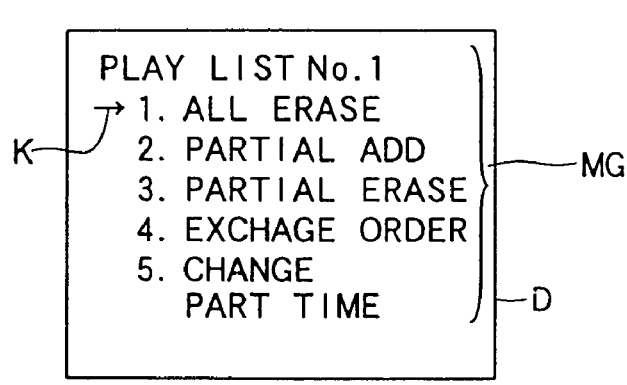
FIG. 12B is a second example of the play list partially erasing process.
Figure 12C:
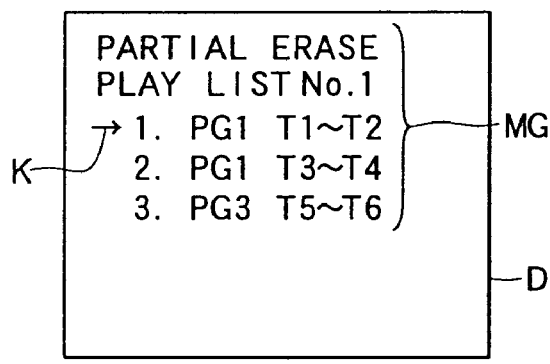
FIG. 12C is a third example of the play list partially erasing process.

Then, a phrase "Partial Erasure", the numbers of the play lists targeted for the edition, the numbers of the respective parts included in the play lists and the respective attributes are displayed on the monitor D, as shown in FIG. 12C (Step S50).

The part to be partially erased is designated by actuating the selection buttons 20*k*, 20*n* (Step S51). Then, it is judged whether or not the determination button 20*m* is pushed down (Step S52). If it is not pushed down (Step S52; No), the operational flow waits for the pushing operation. If it is pushed down (Step S52; Yes), the display of the part designated by the cursor K on the monitor D is turned on and off (Step S53).

Figure 12D:
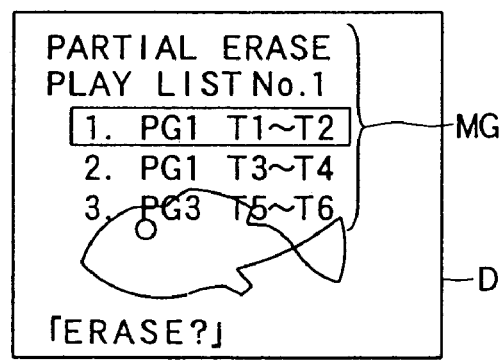
FIG. 12D is a fourth example of the play list partially erasing process.

Then, a picture corresponding to a start time and a picture corresponding to an end time of the part which is designated and turned on and off are respectively detected from the optical disc 1, and they are superimposed on the selection picture shown in FIG. 12C, and alternately indicated as shown in FIG. 12D. Meanwhile, a phrase "Erase ?" is displayed on the monitor D as the message MG (Step S54). This picture is a picture that is displayed as a check picture to check the part to be partially erased.

Then, it is judged whether or not the determination button 20*m* is pushed down (Step S55). If it is not pushed down (Step S55; No), the operational flow waits for the pushing operation. If it is pushed down (Step S55; Yes), the display of the part designated by the cursor K on the monitor D is erased to display a picture indicative of a content of a new play list after the erasure (Step S56).

Then, in the play list currently being indicated, it is checked whether or not the leading picture of the original play list is included in any part determined to be included in the new play list (Step S57). If it is included (Step S57; Yes), the new play list and the designation information of the original leading picture are used to re-write the play list on the optical disc 1 (Step S59). The operational flow returns to the normal display picture. Then, the process for partially erasing the play lists is ended.

On the other hand, in the judgment at the step S57, if the leading picture of the original play list is not included in any part determined to be included in the new play list (Step S57 No), the leading picture of the original (prior to the partial erasure) play list is replaced with the leading picture of the new play list (Step S58). Then, the designation information of the replaced leading picture and the new play list are used to re-write the play list on the optical disc 1 (Step S59). The operational flow returns to the normal display picture (Step S60). Then, the process for partially erasing the play lists is ended.

The operation for partially erasing the play lists will be actually described below with reference to the example shown in FIG. 10C.

In the case of the partial erasure of the play lists, a selection picture (not shown) is firstly displayed by pushing down the menu button 20j. The selection picture shown in FIG. 12A is displayed by designating the edition of the play list. Then, the selection buttons 20k, 20n on the selection picture are used to put the cursor K upon the first play list to then push down the determination button 20m.

By this, the selection picture for the play list edition as shown in FIG. 12B is represented on the monitor D. Then, the selection buttons 20k, 20n on the selection picture are used to put the cursor K upon "Partial Erasure" to push down the determination button 20m.

Thus, the selection picture shown in FIG. 12C is displayed on the monitor D (see. step S50 of FIG. 11).

Then, the selection buttons 20k, 20n are actuated to put the cursor K upon the first part PT1 1 desired to be erased (see. step S51 of FIG. 11). Then, the determination button 20m is pushed down (see. step S52 of FIG. 11; Yes).

By this, a check picture shown in FIG. 12D is displayed on the monitor D (see. step S54 of FIG. 11). During the display of this check picture, the leading portion of the first part PT1 1 is searched for by using the pickup 2, and the reproduction is done for several seconds. And, an ending portion of the first part PT1 1 is searched for, and the reproduction is done for several seconds. Then, those operations are repeated. Thus, a picture for the several seconds at the leading portion of the first part PT1 1 and a picture for the several seconds at the ending portion are repeatedly displayed.

If the determination button 20m is pushed down during the display of this check picture (see. step S55 of FIG. 11; Yes), the first part PT1 1 is erased from the first play list PL1. Then, the information of the first play list PL1 is displayed on the monitor D (see. step S56 of FIG. 11).

Here, the leading picture in the original first play list PL1 (a picture denoted by a symbol A1 of FIG. 10) is not included in a new first play list PL1 after the partial erasure (see. step S57 of FIG. 11; No). Thus, in this case, a picture near a leading portion of the new first play list PL1 (a picture denoted by a symbol A3 of FIG. 10C) is registered in the register of the CPU 17, as a leading picture of the new first play list PL1. Then, the play list on the optical disc 1 is re-written in accordance with the new information and the information of the new first play list PL1 (the information including the second part PT1 2 and the third part PT1 3 of FIG. 10C) (see. step S59 of FIG. 11).

Accordingly, the picture corresponding to the newly selected symbol A3 is displayed as the leading picture indicative of the play list after that.

As mentioned above, according to the reproduction control operation using the play list of the embodiment, the reproduction timing of each part is recorded together with the leading picture of the play list. Thus, each part that was originally recorded can be edited such that it can be reproduced at any reproduction timing. Also, the part to be reproduced can be recognized intuitively and easily by using the leading picture as a key at the time of the reproduction.

Also, the first picture among the pictures included in the leading part of the play list is extracted and recorded as the leading picture. Thus, the content of the play list to be reproduced can be easily recognized at the time of the reproduction.

Moreover, the order of reproducing the plurality of selected parts are respectively designated as the reproduction timing corresponding to each part, and one leading picture collectively representing the plurality of parts is extracted and recorded as the play list. Therefore, the order of reproducing the plurality of parts can be arbitrarily changed and edited. Also, when the plurality of parts are collectively reproduced as the play list, one leading picture enables the content of the play list to be easily recognized.

Furthermore, the plurality of play lists, which are intended to reproduce the plurality of parts in the different reproduction orders, respectively, and contain the different leading pictures from each other for each play list, are generated and recorded on the optical disc 1. Thus, the respective combinations in the different reproduction orders of the plurality of selected parts enable the respective parts to be edited so as to be reproduced in the different reproduction orders. Also, at the time of the reproduction, the content of the play list to be reproduced in each reproduction order can be recognized in accordance with the different selection picture for each reproduction order.

Also, the content of the play list is changed to newly record the changed play list. Thus, one record information can be reproduced in a plural kinds of reproduction manners without the change of the content of the original record information.

Moreover, when the change of the content of the play list is the partial erasure for partially erasing the plurality of parts, if the partial reproduction is not required with regard to the record information, it is possible to easily reproduce the recorded information by removing the unnecessary portion without the change of the original record information.

Furthermore, if the original leading picture is not included in each part to be reproduced in accordance with the play list after the change, the leading picture is replaced with the picture included in the part to be reproduced in accordance with the play list after the change. Thus, even the leading picture can be changed in response to the change of the play list. At the time of the reproduction, it is possible to prevent the output of the leading picture that does not agree with the play list after the change.

Also, if the original leading picture is not included in each part to be reproduced in accordance with the play list after the change, the original leading picture is erased. This enables the leading picture to be changed in response to the change of the play list, and also prevents the output of the leading picture which does not agree with the play list after the change at the time of the reproduction.

In the above-mentioned embodiments, the designation information indicative of the leading picture is included in the play list and recorded when the play list is generated. However, other than this manner, similarly to the case of the above-mentioned reproduction operation for each program, the compressed leading picture itself can be recorded on the optical disc 1 as a part of the play list.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 11-165420 filed on Jun. 11, 1999 including the specification, claims, drawings and summary is incorporated herein by reference in its entirety.

What is claimed is:

1. An information editing apparatus for editing a reproduction manner of record information recorded on an information storage medium, comprising:
    a selecting unit which selects some partial record information from the record information, each partial record information including at least one picture information;
    a designating unit which designates a reproduction timing of the selected some partial record information;
    an extracting unit which extracts the picture information as a representative picture information; and
    a recording unit which records the designated reproduction timing and the extracted representative picture information onto the storage medium as a reproduction control information.

2. An information editing apparatus for editing a reproduction manner of record information recorded on an information storage medium, comprising:
    a selecting unit which selects some partial record information from the record information, each partial record information including at least one picture information;
    a designating unit which designates a reproduction timing of the selected some partial record information;
    an extracting unit which extracts the picture information as a representative picture information; and
    a recording unit which records the designated reproduction timing and a designation information indicative of a record position of the extracted representative picture information onto the storage medium as a reproduction control information.

3. The information editing apparatus according to claim 1 further comprising,
    a display control part for displaying the representative picture information on a monitor.

4. The information editing apparatus according to claim 2 further comprising,
    a display control part for displaying the representative picture information on a monitor.

* * * * *